United States Patent
Tsumano

(10) Patent No.: US 11,752,985 B2
(45) Date of Patent: Sep. 12, 2023

(54) ALTERNATIVE BRAKING APPARATUS FOR A VEHICLE

(71) Applicant: TOYOTA JIDOSHA KABUSHIKI KAISHA, Toyota (JP)

(72) Inventor: Mitsuhiro Tsumano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 303 days.

(21) Appl. No.: 17/130,426

(22) Filed: Dec. 22, 2020

(65) Prior Publication Data

US 2021/0197772 A1 Jul. 1, 2021

(30) Foreign Application Priority Data

Dec. 25, 2019 (JP) ................. 2019-234276

(51) Int. Cl.
*B60T 1/06* (2006.01)
*F16D 67/02* (2006.01)
(Continued)

(52) U.S. Cl.
CPC .............. *B60T 1/062* (2013.01); *F16D 67/02* (2013.01); *F16H 63/486* (2013.01); *G05D 1/0077* (2013.01); *G05D 13/62* (2013.01); *B60T 2270/402* (2013.01); *B62D 15/0285* (2013.01); *F16H 2200/006* (2013.01); *F16H 2200/0069* (2013.01); *F16H 2200/201* (2013.01); *F16H 2200/2007* (2013.01); *F16H 2200/2046* (2013.01); *F16H 2702/02* (2013.01)

(58) Field of Classification Search
CPC .... B60T 1/062; B60T 2270/402; F16D 67/02; F16H 62/486; F16H 2200/006; F16H 2200/0069; F16H 2200/2007; F16H 2200/201; F16H 2200/2046; F16H 2702/02; G05D 1/0077; G05D 13/62; B62D 15/0285
See application file for complete search history.

(56) References Cited

U.S. PATENT DOCUMENTS

2005/0227803 A1* 10/2005 Holmes .................. B60K 6/365
475/204
2007/0093358 A1* 4/2007 Ayabe .................... F16H 61/08
477/97
(Continued)

FOREIGN PATENT DOCUMENTS

JP 2018199368 A 12/2018
JP 2020-063754 A 4/2020

*Primary Examiner* — Nicholas Kiswanto
*Assistant Examiner* — Jamal A Shah
(74) *Attorney, Agent, or Firm* — Dickinson Wright, PLLC

(57) ABSTRACT

An alternative braking apparatus for a vehicle includes a gear type automatic transmission having at least one clutch and at least one brake for changing the meshing state of gears, and a control unit configured to switch the shift stage of the automatic transmission by controlling the clutch and the brake. The control unit is configured to perform alternative braking that controls the clutch and the brake so that an output shaft of the automatic transmission is braked by a braking force of the brake through the gears when the control unit determines that a braking device of the vehicle cannot normally apply braking forces to wheels despite that the vehicle needs to be braked.

5 Claims, 8 Drawing Sheets

(51) Int. Cl.
*F16H 63/48* (2006.01)
*G05D 13/62* (2006.01)
*G05D 1/00* (2006.01)
*B62D 15/02* (2006.01)

(56) References Cited

U.S. PATENT DOCUMENTS

2007/0198145 A1* 8/2007 Norris .................... B62D 1/286
  701/23
2019/0368601 A1* 12/2019 Jacobs ................ F16H 61/0059

* cited by examiner

ALTERNATIVE BRAKING APPARATUS FOR A VEHICLE

CROSS-REFERENCE TO RELATED APPLICATION

This application claims priority to Japanese Patent Application No. JP2019-234276 filed on Dec. 25, 2019, the content of which is hereby incorporated by reference in its entirety into this application.

BACKGROUND

1. Technical Field

The present disclosure relates to an alternative braking apparatus for a vehicle that performs alternative braking using a gear type automatic transmission.

2. Description of the Related Art

In the field of vehicles such as automobiles, in addition to manned automatic traveling such as automatic driving and driving assistance, unmanned automatic traveling such as remote parking and automatic valet parking performed in a situation where no occupant is on the vehicle has been known. For example, an disclosure of remote parking is described in Japanese Patent Laid-Open Publication No. 2018-199368.

In automatic traveling, a vehicle speed is automatically controlled by automatically controlling acceleration/deceleration of a vehicle as necessary, and traveling direction of the vehicle is automatically controlled by automatically controlling a steered angle of steered wheels. In particular, when it becomes necessary to brake the vehicle automatically, a braking device is automatically controlled through a braking control unit to apply required braking forces to wheels, and the vehicle is automatically decelerated and stopped.

If an abnormality occurs in a braking control unit and/or a braking device in a vehicle in which automatic driving is performed and it becomes impossible to apply required braking forces to the wheels, the vehicle cannot be automatically decelerated and stopped even if braking by automatic driving is required. In manned automatic traveling, a driver can stop the vehicle by emergency measures such as operating a parking brake device, but in unmanned automatic traveling, since a driver is off the vehicle, it is desirable that the vehicle can be stopped by alternative braking.

It is conceivable that, by configuring a braking control unit and a braking device in a dual system, even if one system fails, the other system decelerates and stops the vehicle. However, if the braking control unit and the braking device are configured in a dual system, it is inevitable that the structure of the vehicle becomes complicated and the cost of the vehicle becomes high.

By the way, in a vehicle equipped with a gear type automatic transmission including at least one clutch and at least one brake, an output shaft of the automatic transmission can be braked by devising control of the clutch and the brake so that a braking force of the brake is transmitted to the output shaft through gears. Therefore, when an abnormality occurs in the braking control unit and/or the braking device, by controlling the clutch and the brake so that the output shaft of the automatic transmission is braked, it is possible to use the automatic transmission effectively and perform alternative braking without configuring the braking control unit and the braking device in a dual system. It should be noted that this alternative braking is possible not only in a vehicle in which manned automatic traveling is performed and a vehicle in which unmanned automatic traveling is performed, but also in a vehicle which is driven by a driver's driving operation without automatic driving.

The present disclosure provides an alternative braking apparatus for a vehicle in which, when an abnormality occurs in a braking control unit and/or a braking device of the vehicle, a gear type automatic transmission including at least one clutch and at least one brake can be effectively used to perform alternative braking.

SUMMARY

According to the present disclosure, an alternative braking apparatus for a vehicle is provided which includes a gear type automatic transmission having at least one clutch and at least one brake for changing the meshing state of gears, and a control unit configured to switch shift stages of the automatic transmission by controlling the clutch and the brake.

The control unit is configured to perform alternative braking that controls the clutch and the brake to change the meshing state of gears so that a braking force of the brake is transmitted to an output shaft of the automatic transmission through the gears to brake the output shaft when the control unit determines that a braking device of the vehicle cannot normally apply braking forces to wheels despite that the vehicle needs to be braked.

According to the above configuration, alternative braking is performed which controls the clutch and the brake to change the meshing state of gears so that a braking force of the brake is transmitted to an output shaft of the automatic transmission through the gears to brake the output shaft when it is determined that a braking device of the vehicle cannot normally apply braking forces to wheels despite that the vehicle needs to be braked.

Therefore, since the alternative braking can be performed by effectively utilizing the automatic transmission including the clutch and the brake, even in a situation where the braking device of the vehicle cannot normally apply braking forces to the wheels, the vehicle can be decelerated and stopped. In addition, since it is not necessary to configure a braking control unit and the braking device in a dual system, it is possible to avoid a complicated vehicle structure and an increase in vehicle cost.

In one aspect of the present disclosure, a control mode of the clutch and the brake when the alternative braking is performed is different from control modes of the clutch and the brake when the vehicle travels without the alternative braking being performed.

According to the above aspect, the control of the clutch and the brake when the alternative braking is performed does not affect the control of the clutch and the brake when the vehicle travels without the alternative braking being performed. Therefore, it is possible to prevent the control of the clutch and the brake for performing the alternative braking from affecting the control of the shift stage of the automatic transmission when the vehicle travels without the alternative braking being performed.

In another aspect of the present disclosure, the vehicle is configured to be controlled by automatic traveling, and the control unit is configured to perform the alternative braking when the control unit determines that the braking device of the vehicle cannot normally apply braking forces to the wheels despite that the vehicle needs to be braked during the control of the automatic traveling.

According to the above aspect, when it is determined that the braking device of the vehicle cannot normally apply braking forces to the wheels despite that the vehicle needs to be braked during automatic traveling control, the vehicle can be decelerated and stopped by the alternative braking.

Further, in another aspect of the present disclosure, the automatic traveling is any one of automatic traveling for unmanned remote parking, automatic traveling for unmanned automatic valley parking, automatic traveling for manned driving assistance, and automatic traveling for manned automatic driving.

According to the above aspect, the vehicle can be decelerated and stopped by the alternative braking when it is determined that a braking device of the vehicle cannot normally apply braking forces to wheels in a situation where the automatic traveling for unmanned remote parking, the automatic traveling for unmanned automatic valley parking, the automatic traveling for manned driving assistance, or the automatic traveling for manned automatic driving is performed and the vehicle needs to be braked.

Further, in another aspect of the present disclosure, the control unit is configured to perform the alternative braking when the control unit determines that the braking device of the vehicle cannot normally apply braking forces to the wheels despite that the vehicle needs to be braked while the vehicle is driven by a driver.

According to the above aspect, when it is determined that the braking device of the vehicle cannot normally apply braking forces to the wheels despite that the vehicle needs to be braked while the vehicle is driven by the driver, the vehicle can be decelerated and stopped by the alternative braking.

Further, in another aspect of the present disclosure, the control unit is configured to control the clutch and the brake so that the output shaft of the automatic transmission is braked by the braking force of the brake but an input shaft of the automatic transmission is not braked by the braking force of the brake.

According to the above aspect, when the alternative braking is performed, not only the output shaft of the automatic transmission can be braked by the braking force of the brake, but also the input shaft of the automatic transmission can be prevented from being braked by the braking force of the brake. Therefore, since the input shaft can freely rotate even when the alternative braking is performed, it is possible to prevent a drag torque from being applied to a driving device such as an engine and stall of the driving device due to the drag torque from occurring.

It should be noted that in the present application, switching of shift stages is a concept including not only switching the gear ratio but also changing a meshing mode of the gears in response to the change in the shift position, such as switching between forward and reverse.

Other objects, other features and attendant advantages of the present disclosure will be readily understood from the description of the embodiments of the present disclosure described with reference to the following drawings.

DETAILED DESCRIPTION

The present disclosure will now be described in detail with reference to the accompanying drawings.

First Embodiment

Figure 1:
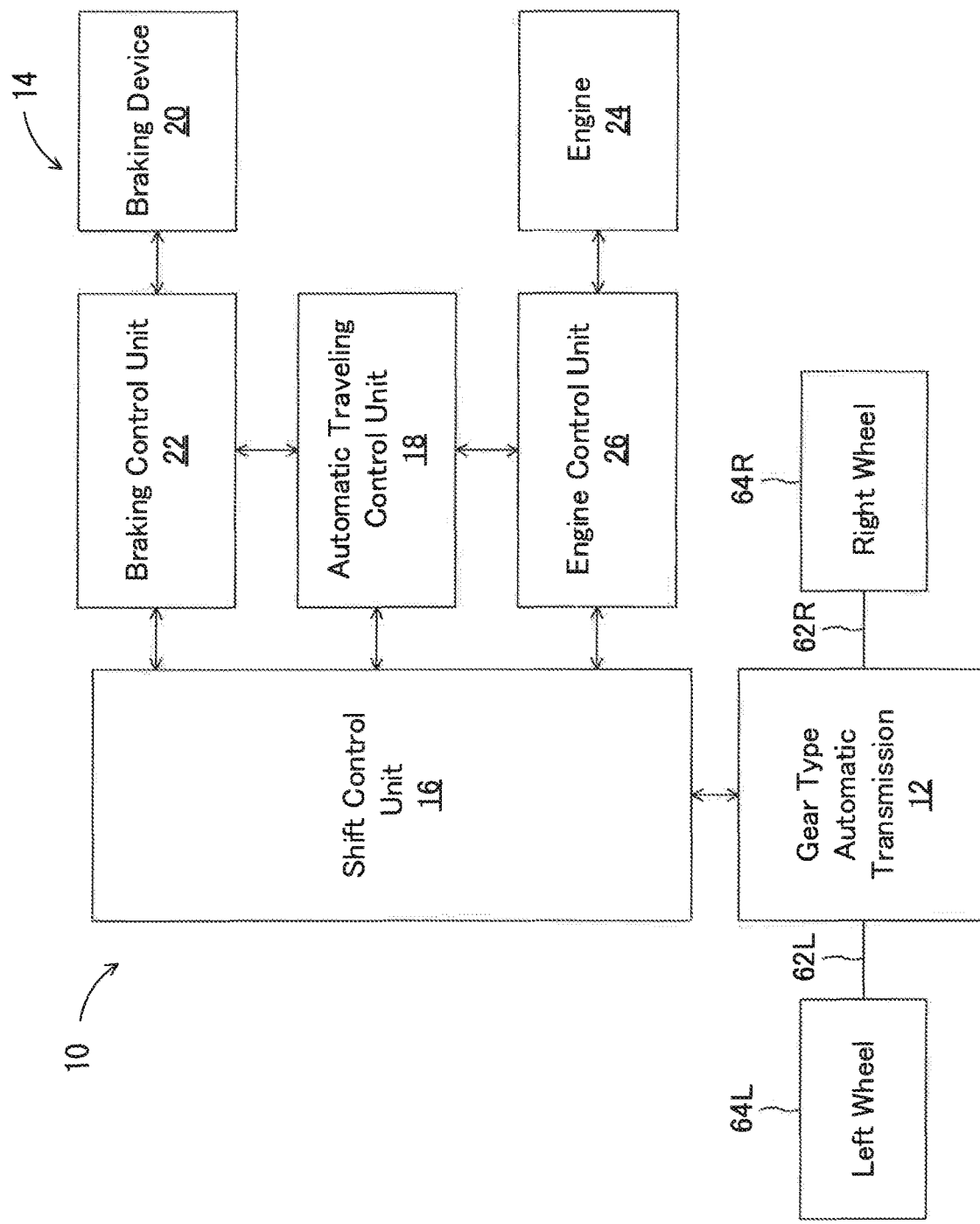
FIG. 1 is a control block diagram including a first embodiment of an alternative braking apparatus for a vehicle according to the present disclosure.

As shown in FIG. 1, the alternative braking apparatus 10 according to the first embodiment is applied to a vehicle 14 including a gear type automatic transmission 12, and includes a shift control unit 16 that controls the automatic transmission 12. The vehicle 14 further includes an automatic traveling control unit 18 that controls automatic traveling such as automatic driving, a braking device 20 that applies braking forces to wheels of the vehicle 14, and a braking control unit 22 that controls the braking device.

The shift control unit 16 controls shift stages of the automatic transmission 12 as described in detail later. The automatic traveling control unit 18 outputs a control command to the shift control unit 16, an engine control unit 26 that controls an engine 24 functioning as a driving device, and the braking control unit 22 as needed to control acceleration and deceleration and stop of the vehicle 14 in the automatic traveling. Although not shown in FIG. 1, the automatic traveling control unit 18 also outputs a control command to a steered angle control unit that controls a steered angle of steered wheels as necessary.

The automatic traveling may be any automatic traveling known in the art that does not depend on driving by a driver. For example, the automatic traveling may be any of unmanned remote parking automatic traveling, unmanned automatic valley parking automatic traveling, manned driving assistance automatic traveling, and manned automatic traveling of automatic driving.

The braking control unit 22 decelerates and stops the vehicle 14 by controlling the braking device 20 that applies braking forces to the wheels. Further, the braking control unit 22 self-diagnoses whether or not an abnormality in which braking forces cannot be normally applied to the wheels has occurred in the braking device 20 and/or the braking control unit 22.

Figure 2:
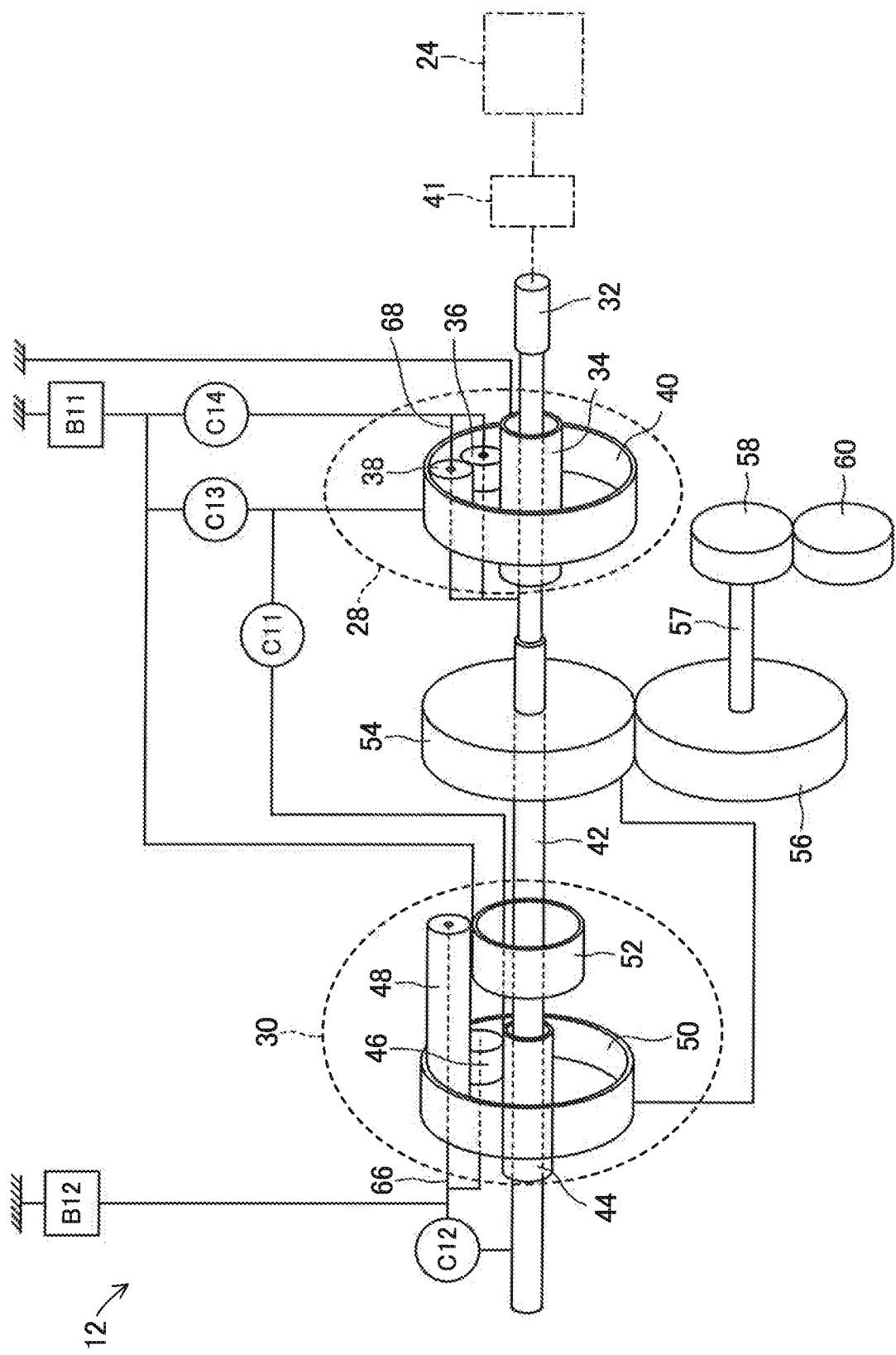
FIG. 2 is an explanatory view showing a gear type automatic transmission of the alternative braking apparatus of the first embodiment configured as an 8-speed automatic transmission for a front-wheel drive vehicle.

Although not shown in FIGS. 1 and 2, the shift control unit 16, the automatic traveling control unit 18, the braking control unit 22, the engine control unit 26, and the steered angle control unit each include a microcomputer having a CPU, a ROM, a RAM, and an input/output port device connected to each other by a bidirectional common bus. The control units are mutually connected by CAN or the like, and exchange information with each other by communication as necessary.

As shown in FIG. 2, the automatic transmission 12 in the first embodiment is an 8-speed automatic transmission for a front-wheel drive vehicle that has first to eighth forward shift stages and one reverse shift stage, and includes a front planetary gear device 28 and a rear planetary gear device 30. The planetary gear devices 28 and 30 are dual pinion type planetary gear devices.

The front planetary gear device 28 includes a front sun gear 34 that is integrally coupled to an input shaft 32, an inner pinion gear 36 that meshes with the front sun gear 34, an outer pinion gear 38 that meshes with the front sun gear 34, and a front planetary ring gear 40 that meshes with the outer pinion gear 38. The input shaft 32 is connected to an output shaft of the engine 24 via a torque converter 41 schematically shown at the right end in FIG. 2, and receives a driving torque from the engine.

The rear planetary gear device 30 includes a rear sun gear 44 that is integrally connected to an intermediate shaft 42, a short pinion gear 46 that meshes with the rear sun gear 44, a long pinion gear 48 that meshes with the short pinion gear 46, and a rear planetary ring gear 50 that meshes with the long pinion gear 48. The long pinion gear 48 projects from the rear planetary gear device 30 and extends toward the front planetary gear device 28.

A middle sun gear 52 is integrally coupled to the intermediate shaft 42 adjacent to the rear planetary gear device 30, and the middle sun gear 52 meshes with the long pinion gear 48. Further, a counter drive gear 54 is integrally coupled to the intermediate shaft 42 at a position between the middle sun gear 52 and the front planetary gear device 28. The input shaft 32 and the intermediate shaft 42 can rotate relative to each other.

The counter drive gear 54 meshes with a counter driven gear 56. The counter driven gear 56 is integrally coupled to a differential drive pinion gear 58 by an output shaft 57, and the differential drive pinion gear 58 meshes with a differential ring gear 60. The differential drive pinion gear 58 and the differential ring gear 60 transmit driving torque to left and right front wheels 64L and 64R, which are drive wheels, via drive shafts 62L and 62R as shown in FIG. 1.

In FIG. 2, C11 is No. 1 clutch, and connects the front planetary ring gear 40 and the rear sun gear 44 as necessary. C12 is No. 2 clutch, and connects the intermediate shaft 42 and the rear planetary carrier 66 as required. C13 is No. 3 clutch, and connects the front planetary ring gear 40 and the middle sun gear 52 as needed. Further, C14 is No. 4 clutch, and connects the front planetary carrier 68 and the middle sun gear 52 as necessary.

Further, B11 is No. 1 brake, and applies a braking force to the middle sun gear 52 to lock it as necessary. B12 is No, 2 brake, and applies a braking force to the rear planetary carrier 66 to lock it as required. Although not shown in FIG. 2, connection and disconnection by the clutches C11 to C14 is controlled by the shift control unit 16. Similarly, the lock and unlock of the brakes B11 and B12 are controlled by the shift control unit 16.

It is to be noted that a braking pressure generator (not shown) for operating the brakes B11 and B12 is a device different from a high pressure generator (not shown) of the braking device 20. Therefore, even if an abnormality occurs in the latter high pressure generator, the brakes B11 and B12 can be operated and a required braking force can be applied.

The shift control unit 16 normally controls the clutches C11 to C14 and the brakes B11 and B12 to switch the shift stages as shown in Table 1 below. It should be noted that in Table 1, O and X mean connection and disconnection, respectively, for the clutches C11 to C14 and lock and unlock, respectively, for brakes B11 and B12. Further, in Table 1, P, R, N, D and M mean the shift positions of parking, reverse, neutral, drive and manual, respectively. The same applies to Table 2 of the second embodiment described later.

TABLE 1

| Shift Positions | Shift Stages | Clutch | | | | Brake | |
|---|---|---|---|---|---|---|---|
| | | C11 | C12 | C13 | C14 | B11 | B12 |
| P | | X | X | X | X | X | X |
| R | | X | X | O | X | X | O |
| N | | X | X | X | X | X | X |
| D, M | 1st | O | X | X | X | X | O |
| | 2nd | O | X | X | X | O | X |
| | 3rd | O | X | O | X | X | X |
| | 4th | O | X | X | O | X | X |
| | 5th | O | O | X | X | X | X |
| | 6th | X | O | X | O | X | X |
| | 7th | X | O | O | X | X | X |
| | 8th | X | O | X | X | O | X |

<Alternative Braking Control>

When an abnormality occurs in the braking device 20 and/or the braking control unit 22 and the braking device cannot apply normally braking forces to the wheels despite the need for braking to decelerate and stop the vehicle 14 during automatic traveling, the shift control unit 16 uses the automatic transmission 12 to perform the alternative braking control. This also applies to the second to fourth embodiments described later.

In the alternative braking control of the first embodiment, the brakes B11 and B12 are operated with the clutches C11 to C14 released, that is, with their connections being released. Note that the control mode of the clutches C11 to C14 and the brakes B11 and B12 in the alternative braking control is not included in the control modes of the clutches C11 to C14 and the brakes B11 and B12 in the normal shift control of the automatic transmission 12 shown in Table 1 above, that is, in the shift control when the alternative braking control is not performed.

The brake B11 is operated so that the middle sun gear 52 is braked, and the brake B12 is operated so that the rear planetary carrier 66 is locked and the rear sun gear 44 is braked. As a result, the intermediate shaft 42 is braked, a braking torque is transmitted to the counter driven gear 56 via the counter drive gear 54, and the output shaft 57 is thereby braked. The braking torque is further transmitted to the left and right front wheels 64L and 64R via the differential drive pinion gear 58, the differential ring gear 60, and the drive shafts 62L and 62R, whereby the left and right front wheels are braked.

When both brakes B11 and B12 are operated with a high braking pressure, a relief valve (not shown) for preventing gear lock operates. Therefore, it is preferable that the brake B12 is operated at a high braking pressure, the brake B11 is operated at a low braking pressure, and the braking pressure of the brake B11 is adjusted so that a deceleration of the vehicle becomes a required deceleration.

<Shift Control by Shift Control Unit>

Figure 3:
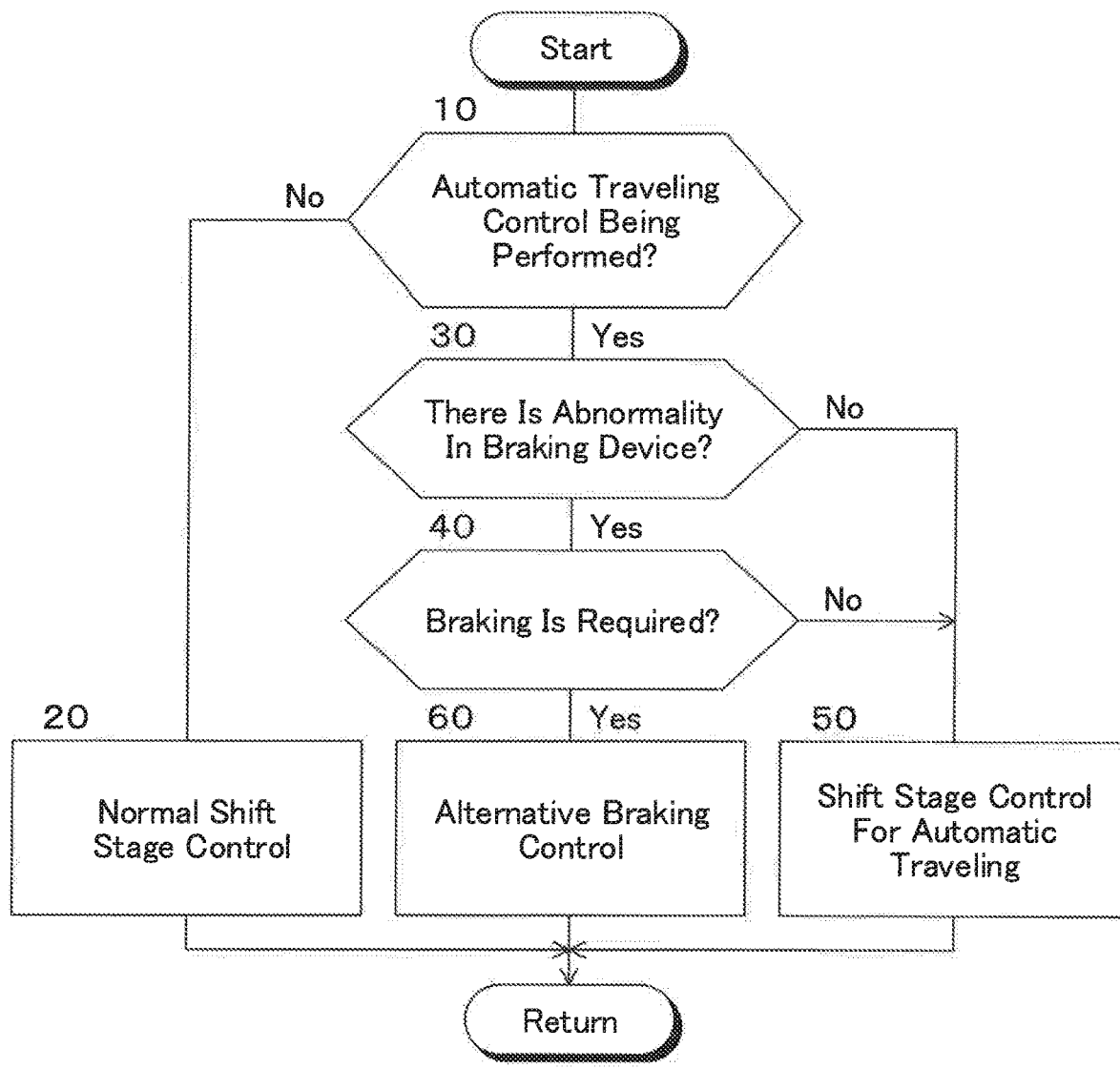
FIG. 3 is a flowchart showing a shift control routine including alternative braking control in the first embodiment.

Next, a shift control routine including alternative braking control in the first embodiment will be described with reference to the flowchart shown in FIG. 3. The shift control according to the flowchart shown in FIG. 3 is repeatedly executed at predetermined time intervals by the shift control unit 16 when an ignition switch (not shown) is turned on.

First, in step 10, based on information transmitted from the automatic traveling control unit 18, a determination is made as to whether or not automatic traveling control such as remote parking is being performed. When an affirmative determination is made, the shift control proceeds to step 30, and when a negative determination is made, the shift control proceeds to step 20.

In step 20, the normal shift control is performed in a manner known in the art according to a driving operation of the driver and traveling conditions of the vehicle. That is, by controlling the clutches C11 to C14 and the brakes B11 and B12, the shift stage of the automatic transmission 12 is controlled as shown in Table 1 above.

In step 30, based on information transmitted from the braking control unit 22, a determination is made as to whether or not there is an abnormality in the braking device 20 and/or the braking control unit 22 in which the braking device 20 cannot normally apply braking forces to the wheels. When a negative determination is made, the shift control proceeds to step 50, and when an affirmative determination is made, the shift control proceeds to step 40.

In step 40, a determination is made as to whether or not braking is required. When an affirmative determination is made, the shift control proceeds to step 60, and when a negative determination is made, the shift control proceeds to step 50. When it is determined that any of the following conditions (1) to (3) is satisfied, it may be determined that braking is required.
  (1) Based on information transmitted from the automatic traveling control unit 18, it is determined that braking by the automatic traveling control is required.
  (2) It is estimated that braking forces cannot be normally applied to the wheels due to an abnormality of the braking device 20 and/or the braking control unit 22.
  (3) Communication with the braking control unit 22 cannot be performed, and it cannot be confirmed that braking forces can be normally applied to the wheels.

In step 50, control of the shift stage necessary for achieving automatic traveling is being performed based on information transmitted from the automatic traveling control unit 18. That is, similarly to step 20, the clutches C11 to C14 and the brakes B11 and B12 are controlled so that the shift stage of the automatic transmission 12 is controlled as shown in Table 1 above.

In step 60, the alternative braking control is performed. That is, the brakes B11 and B12 are operated with the clutches C11 to C14 released. Therefore, as described above, a braking torque is transmitted to the output shaft 57 through the gears, and is further transmitted to the left and right front wheels 64L and 64R, whereby the left and right front wheels are braked, so that the vehicle 14 is decelerated, and if necessary, the vehicle is stopped.

In the alternative braking control of the first embodiment, the brakes B11 and B12 are operated with the clutches C11 to C14 disconnected. Therefore, since the front sun gear 34, the inner pinion gear 36, the outer pinion gear 38, and the front planetary ring gear 40 are not braked, the input shaft 32 is not braked. Accordingly, even when the alternative braking is performed, the input shaft 32 can freely rotate, so that it is possible to avoid giving a drag torque to the engine 24 and stall of the engine due to the drag torque.

Further, the input shaft 32 is connected to the output shaft of the engine 24 via the torque converter 41, it is prevented by the torque converter that a high drag torque is applied to the engine 24, which also enables to avoid the stall of the engine. The action of the torque converter in the alternative braking control can also be obtained in other embodiments described later.

Further, although not shown in the figure, in a situation where the braking device 20 and the braking control unit 22 are normal and the unmanned automatic traveling control is executed, when the braking request by the automatic traveling control occurs, a braking command is output from the automatic traveling control unit 18 to the braking control unit 22. Therefore, the braking control unit 22 applies braking forces to the wheels by controlling the braking device 20 according to the braking command. This also applies to other embodiments described later.

Second Embodiment

Figure 4:
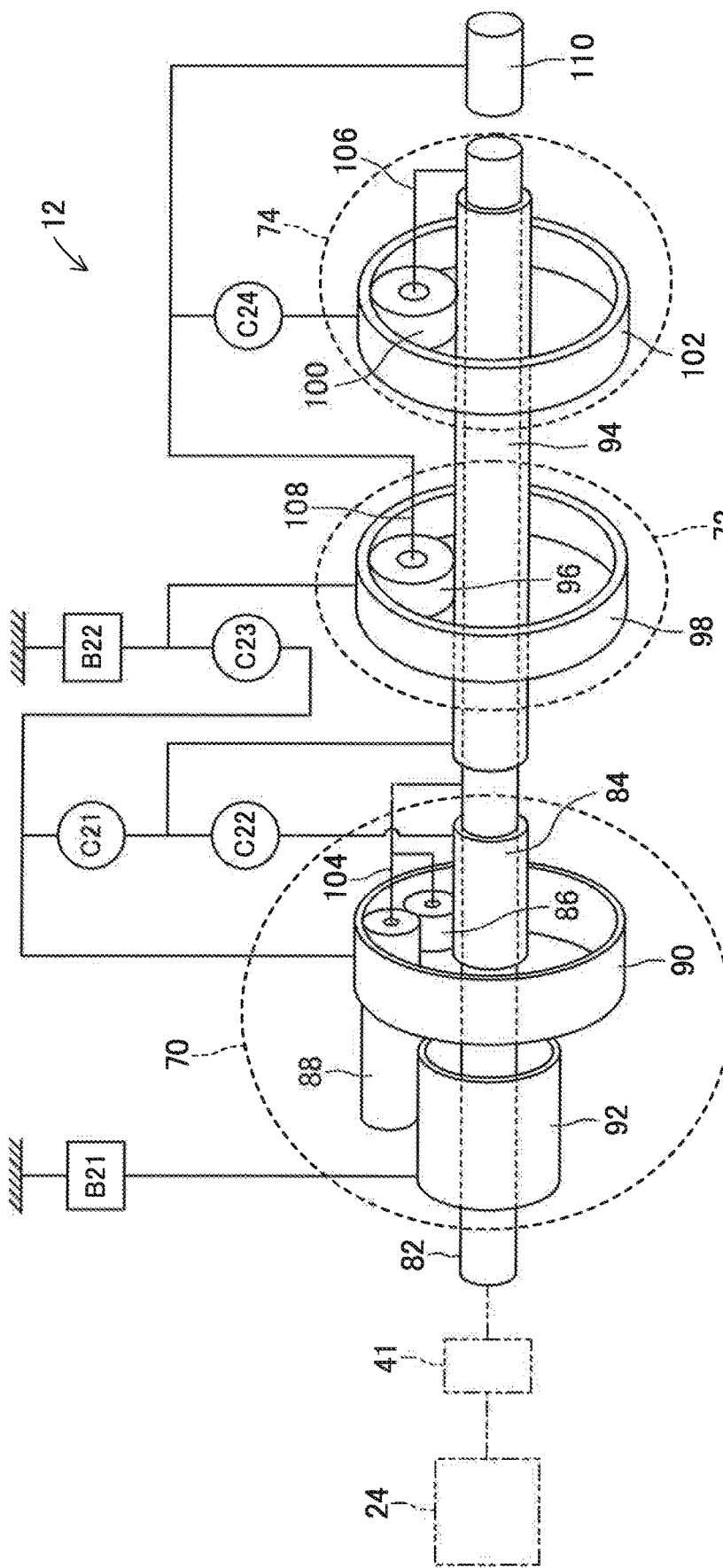
FIG. 4 is an explanatory view showing a gear type automatic transmission of the alternative braking apparatus of a second embodiment configured as a 10-speed automatic transmission for a rear-wheel drive vehicle.

FIG. 4 is an explanatory diagram showing a gear type automatic transmission 12 of the alternative braking device according to the second embodiment. The configuration of the vehicle to which the alternative braking device according to the second embodiment is applied is the same as the configuration of the vehicle in the first embodiment shown in FIG. 1. This also applies to the third and fourth embodiments described below.

The gear type automatic transmission 12 according to the second embodiment is a 10-speed automatic transmission for a rear-wheel drive vehicle that has forward shift stages from the first speed to the tenth speed and a reverse shift stage, and includes a front planetary gear device 70, a middle planetary gear device 72 and a rear planetary gear device 74. The front planetary gear device 70 is a dual pinion type planetary gear device.

The front planetary gear device 70 includes a front planetary sun gear (small) 84 that is integrally coupled to an input shaft 82, a front planetary short pinion gear 86 that meshes with the front planetary sun gear (small) 84, a front planetary long pinion gear 88 that meshes with the front planetary short pinion gear 86, and a planetary ring gear 90 that meshes with the front planetary long pinion gear 88. The input shaft 82 is connected to an output shaft of the engine 24 via a torque converter 41 at the left end portion in FIG. 4, and receives driving torque from the engine.

A front planetary sun gear (large) 92 is integrally coupled to the input shaft 82 on the engine 24 side with respect to the front planetary sun gear (small) 84. The front planetary long pinion gear 88 extends from the front planetary ring gear 90 so as to project toward the engine 24 side, and meshes with the front planetary sun gear (large) 92.

The middle planetary gear device 72 includes a middle/rear planetary sun gear 94 that is integrally coupled to the input shaft 82, a middle planetary pinion gear 96 that meshes with the middle/rear planetary sun gear 94, and a middle planetary ring gear 98 that meshes with the middle planetary pinion gear 96. The middle/rear planetary sun gear 94 extends from a position on the side of the front planetary gear device 70 with respect to the middle planetary gear device 72 to a position on the opposite side of the middle planetary gear device 72 with respect to the rear planetary gear device 74.

The rear planetary gear device 74 is configured similarly to the middle planetary gear device 72, and includes the middle/rear planetary sun gear 94, a rear planetary pinion gear 100 that meshes with the middle/rear planetary sun gear 94, and a rear planetary ring gear 102 that meshes with the rear planetary pinion gear 100. A carrier 104 of the front planetary gear device 70 and a carrier 106 of the rear planetary gear device 74 are connected to the input shaft 82, and a carrier 108 of the middle planetary gear device 72 is connected to the output shaft 110. Although not shown in the figure, an output shaft 110 is connected to left and right rear wheels, which are drive wheels, via a rear differential and left and right drive shafts.

In FIG. 4, C21 is No. 1 clutch, and connects the front planetary ring gear 90 and the middle/rear planetary sun gear 94 as necessary. C22 is No. 2 clutch, and connects the front planetary sun gear (small) 84 and the middle/rear planetary sun gear 94 as required. C23 is No. 3 clutch, and connects the front planetary ring gear 90 and the middle planetary ring gear 98 as needed. Further, C24 is No. 4 clutch, and connects the carrier 108 of the middle planetary gear device 72 and the rear planetary ring gear 102 as necessary.

In addition, the No. 1 clutch C21 connects the middle/rear planetary sun gear 94 and the middle planetary ring gear 98 when the No. 3 clutch C23 is in the connected state. The No. 2 clutch C22 connects the front planetary sun gear (small) 84 and the front planetary ring gear 90 when the No. 1 clutch C21 is in the connected state. Furthermore, the No. 3 clutch C23 connects the middle/rear planetary sun gear 94 and the middle planetary ring gear 98 when the No. 1 clutch C21 is in the connected state.

Further, B21 is No. 1 brake, and applies a braking force to the front planetary sun gear (large) 92 to lock it as necessary. B22 is No. 2 brake, and applies a braking force to the middle planetary ring gear 98 to lock it as needed. In addition, when the No. 3 clutch C23 is in the connected state, the No. 2 brake B22 also applies a braking force to the front planetary ring gear 90 to lock it.

It is to be noted that a braking pressure generator (not shown) for operating the brakes B21 and B22 is a device different from a high pressure generator (not shown) of the braking device 20. Therefore, even if an abnormality occurs in the latter high pressure generator, the brakes B21 and B22 can be operated and required braking forces can be applied.

Although not shown in FIG. 4, similarly to the first embodiment, the connection and disconnection by the clutches C21 to C24 are controlled by the shift control unit 16. The lock and unlock by the brakes B21 and B22 are also controlled by the shift control unit 16.

The shift control unit 16 normally controls the clutches C21 to C24 and the brakes B21 and B22 to switch the shift stages as shown in Table 2 below. In Table 2 below, Δ means that the engagement pressure of the clutch is gradually increased.

TABLE 2

| Shift Positions | Shift Stages | Clutch | | | | Brake | |
|---|---|---|---|---|---|---|---|
| | | C21 | C22 | C23 | C24 | B21 | B22 |
| P | | X | Δ | X | X | X | O |
| R | | X | O | O | X | X | O |
| N | | X | X | X | X | X | X |
| D, M | 1st | O | O | X | X | X | O |
| | 2nd | O | X | X | X | O | O |
| | 3rd | X | O | X | X | O | O |
| | 4th | X | X | X | O | O | O |
| | 5th | X | O | X | O | O | X |
| | 6th | O | X | X | O | O | X |
| | 7th | O | X | O | O | X | X |
| | 8th | X | X | O | O | O | X |
| | 9th | O | X | O | X | O | X |
| | 10th | X | O | O | X | O | X |

The shift control including the alternative braking control in the second embodiment is also executed according to the flowchart shown in FIG. 3, similarly to the shift control in the first embodiment. In addition, this also applies to the third and fourth embodiments described later.

<Alternative Braking Control>

In the alternative braking control in the second embodiment, only the brake B22 is operated with the clutches C21 and C23 connected and the clutches C22 and C24 disconnected. It is to be noted that the control mode of the clutches C21 to C24 and the brakes B21 and B22 in the alternative braking control is not included in the control modes of the clutches C21 to C24 and the brakes B21 and B22 in the normal control of the shift stages of the automatic transmission 12 shown in Table 2 above.

By operating only the brake B22 with the clutches C21 and C23 being connected and the clutches C22 and C24 being disconnected, the middle planetary ring gear 98 is braked and the middle/rear planetary sun gear 94 is braked via the clutches C21 and C23. Therefore, the output shaft 110 is braked by braking the middle planetary pinion gear 96, and further, left and right rear wheels are braked via a rear differential and left and right drive shafts, whereby the vehicle 14 is decelerated and t is stopped as necessary.

Since the clutch C24 is not connected, the rear planetary ring gear 102 and the rear planetary pinion gear 100 are not braked. Further, since the brake B21 is not operated, the front planetary sun gear (large) 92 is not braked. Therefore, a braking torque applied to the input shaft 82 is smaller than when the clutch C24 is also connected and when the front planetary sun gear (large) 92 is also braked. Thus, when the brake B22 is actuated, rotation of the input shaft 82 can be gradually reduced by gradually increasing a braking force of the brake B22. Accordingly, in addition to the action of the torque converter 41, this also reduces a drag torque applied to the engine 24 during the alternative braking.

Third Embodiment

Figure 5:
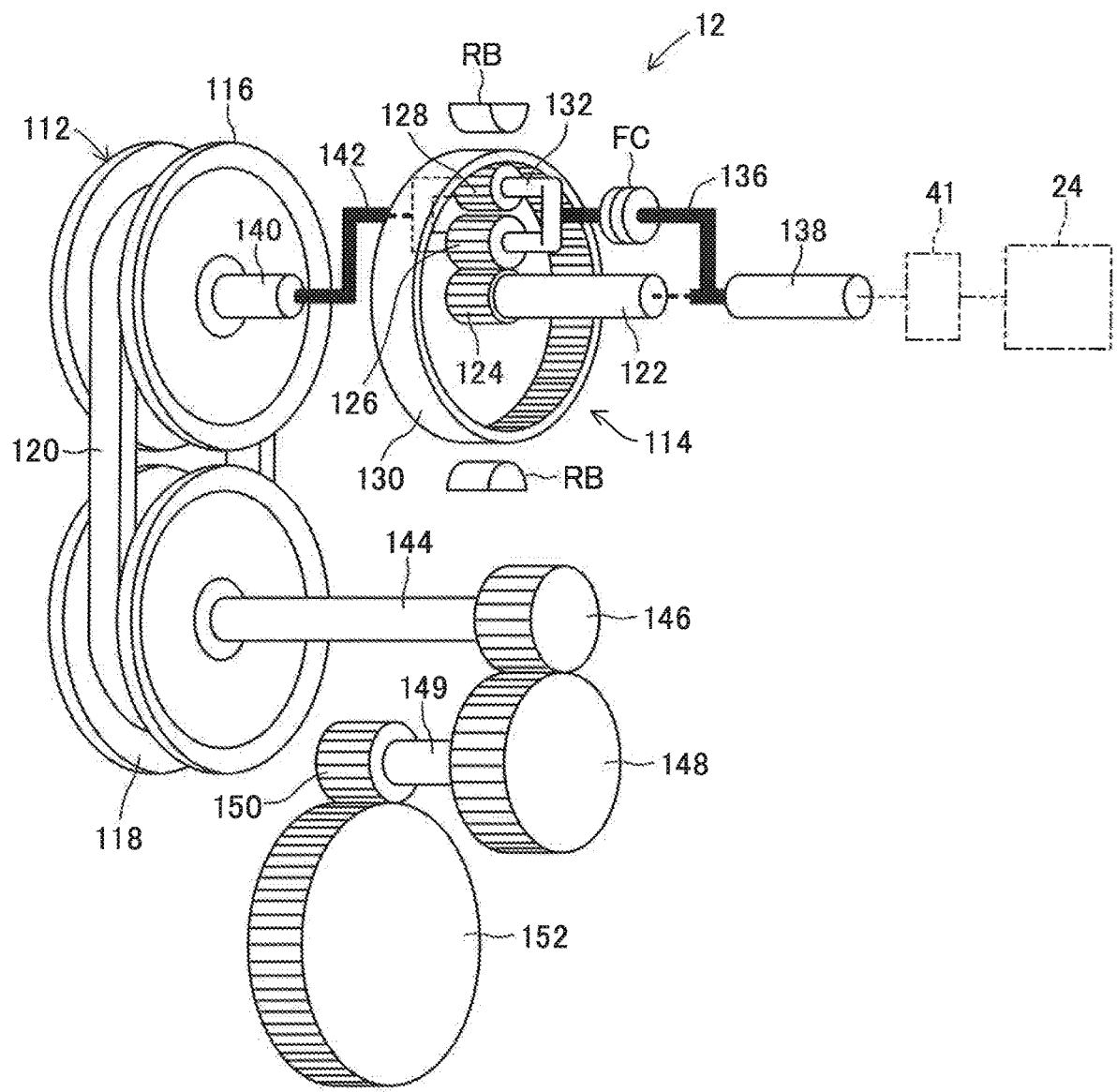
FIG. 5 is an explanatory diagram showing a gear type automatic transmission of the alternative braking apparatus of a third embodiment configured as a gear type automatic transmission for a front-wheel drive vehicle including a continuously variable transmission.

FIG. 5 is an explanatory diagram showing a gear type automatic transmission 12 of the alternative braking device according to the third embodiment. The gear type automatic transmission 12 in this embodiment is a gear type automatic transmission for a front-wheel drive vehicle provided with a continuously variable transmission (CVT) 112, and includes a planetary gear device 114. The planetary gear device 114 is a dual pinion type planetary gear device.

The continuously variable transmission 112 includes a primary pulley 116, a secondary pulley 118, and a metal belt 120 wound around these pulleys. As is well known, the continuously variable transmission 112 is configured to change a gap between each pair of disks of the primary pulley 116 and the secondary pulley 118 to change the winding diameters of the metal belt 120 on the two pulleys, thereby continuously changing a speed ratio.

The planetary gear device 114 includes a sun gear 124 integrally provided on an intermediate shaft 122, an inner pinion gear 126 that meshes with the sun gear 124, an outer pinion gear 128 that meshes with the inner pinion gear 126, and a ring gear 130 that meshes with the outer pinion gear 128. A carrier 132, which supports the inner pinion gear 126 and the outer pinion gear 128, is configured to be connectable to an input shaft 138 via a crank 136 by a forward clutch FC.

The input shaft 138 is configured to be connectable to the intermediate shaft 122 at one end, and is connected to an output shaft of the engine 24 at the other end via a torque converter 41, and receives a driving torque from the engine. It should be noted that the input shaft 138 is disconnected from the intermediate shaft 122 when the forward clutch FC is in a connected state, and is connected to the intermediate shaft 122 when the forward clutch FC is in a disconnected state.

A reverse brake RB is provided outside the ring gear 130 of the planetary gear device 114, The reverse brake RB is configured to apply a braking force to the ring gear 130 when it is in an operating state. Further, the reverse brake RB is maintained in the non-operating state in which the braking force is not applied to the ring gear 130 when the forward clutch FC is in the connected state, and is set in the operating state when the forward clutch FC is in the disconnected state. The states of the forward clutch FC and the reverse brake RB are controlled by the shift control unit 16.

It is to be noted that a braking pressure generator (not shown) for actuating the reverse brake RB is a device different from a high pressure generator (not shown) of the braking device 20. Therefore, even if an abnormality occurs in the latter high pressure generator, the reverse brake RB can be operated and a necessary braking force can be applied.

A shaft 140 of the primary pulley 116 is connected to the carrier 132 by a crank 142. A reduction drive gear 146 is integrally provided on a shaft 144 of the secondary pulley 118 and meshes with a reduction driven gear 148. The reduction driven gear 148 is integrally connected to a differential drive pinion gear 150 by an output shaft 149, and the differential drive pinion gear 150 meshes with a differential ring gear 152, The differential drive pinion gear 150 and the differential ring gear 152 transmit driving torque to the left and right front wheels 64L and 64R, which are drive wheels, via the drive shafts 62L and 62R as shown in FIG. 1.

<Switching Between Forward and Backward Movements>

When the vehicle 14 is moving forward, the forward clutch FC is connected while the reverse brake RB is inactive, and the connection between the intermediate shaft 122 and the input shaft 138 is released. As a result, a driving force of the input shaft 138 is transmitted to the shaft 140 of the primary pulley 116 via the crank 136, the forward clutch FC, the carrier 132, the inner pinion gear 126, the outer pinion gear 1218, and the crank 142.

On the other hand, when the vehicle 14 is moving backward, the reverse brake RB is operated with the forward clutch FC being disconnected, and the intermediate shaft 122 and the input shaft 138 are connected. As a result, a driving force of the input shaft 138 is transmitted to the shaft 140 of the primary pulley 116 via the intermediate shaft 122, the sun gear 124, the inner pinion gear 126, the outer pinion gear 128, the carrier 132, and the crank 142. The rotation direction of the shaft 140 is changed by the planetary gear device 114 in a direction opposite to that when the vehicle 14 is moving forward.

Regardless of whether the vehicle 14 is moving forward or backward, a continuous speed ratio control is performed by changing the winding diameters of the metal belt 120 around the primary pulley 116 and the secondary pulley 118 by the shift control unit 16 as described above.

<Alternative Braking Control>

In the alternative braking control in the third embodiment, the forward clutch FC is connected and the reverse brake RB is operated. The control mode in which the forward clutch FC is connected and the reverse brake RB is operated is different from the control modes in which the forward clutch FC and the reverse brake RB are controlled when the vehicle 14 is moving forward and backward.

The forward clutch FC is connected and the reverse brake RB is operated, so that the ring gear 130 is braked, and the inner pinion gear 126, the outer pinion gear 128 and the carrier 132 are braked. A braking torque is transmitted to the shaft 140 of the primary pulley 116 by the crank 142, and is further transmitted to the reduction drive gear 146 via the primary pulley 116, the metal belt 120, the secondary pulley 118, and the shaft 144.

Further, the braking torque is transmitted to the output shaft 149 via the reduction drive gear 146 and the reduction driven gear 148, and the output shaft is braked. The braking torque is further transmitted to the left and right drive shafts 62L and 62R via the differential drive pinion gear 150 and the differential ring gear 152. As a result, the left and right front wheels 64L and 64R are braked, whereby the vehicle 14 is decelerated, and the vehicle is stopped as necessary.

The carrier 132 that supports the inner pinion gear 126 and the outer pinion gear 128 is connected to the input shaft 138 via the crank 136 by the forward clutch FC. Therefore, although the input shaft 138 is also braked, since the input shaft 138 is connected to the output shaft of the engine 24 via the torque converter 41, the engine 24 is prevented from being given a high drag torque by the torque converter 41.

Fourth Embodiment

Figure 6:
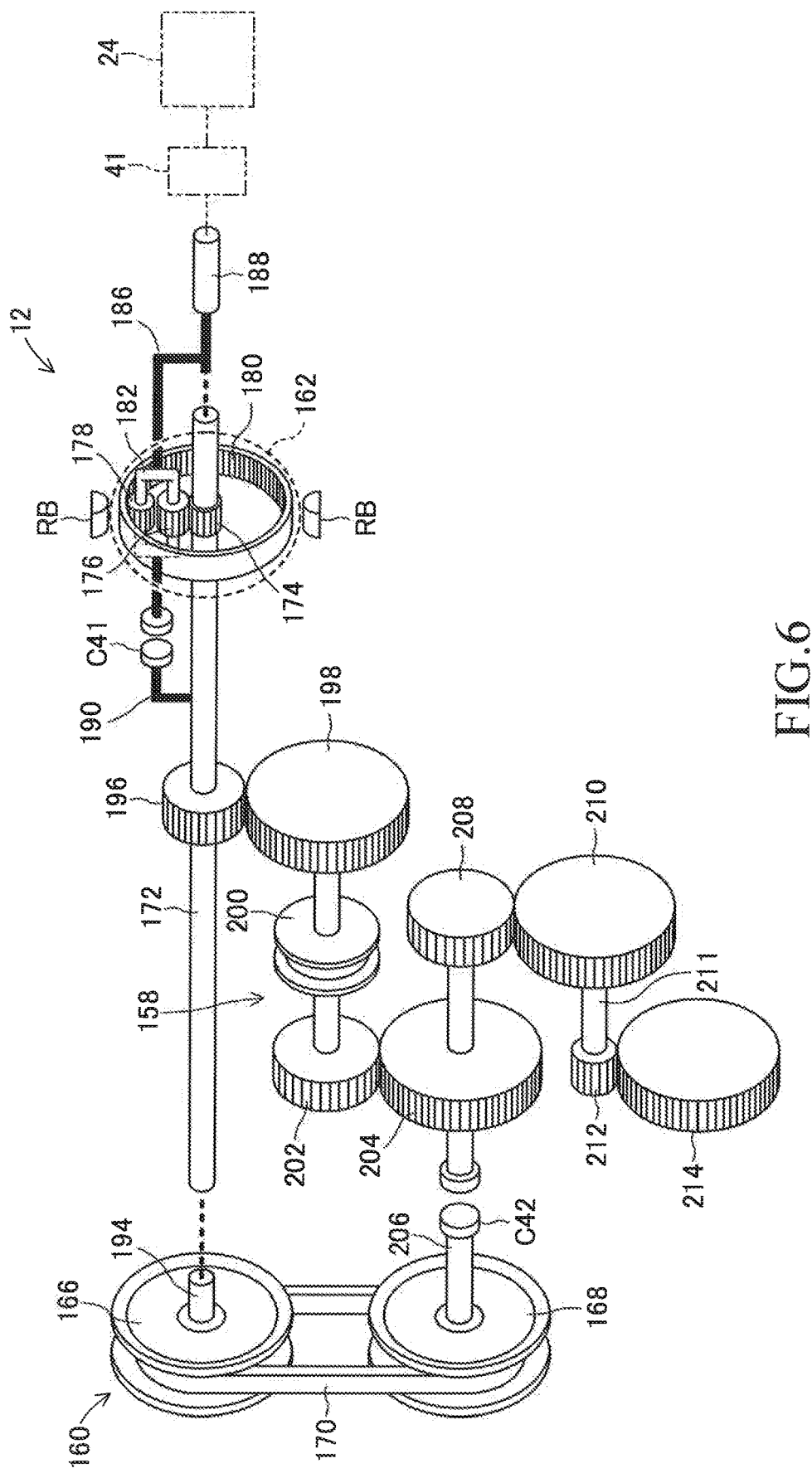
FIG. 6 is an explanatory view showing a gear type automatic transmission of the alternative braking apparatus of a fourth embodiment configured as a gear type automatic transmission for a front-wheel drive vehicle equipped with a starting gear and a continuously variable transmission.

FIG. 6 is an explanatory diagram showing a gear type automatic transmission 12 of the alternative braking apparatus according to the fourth embodiment. The gear-type automatic transmission 12 in this embodiment is a gear-type transmission for a front-wheel drive vehicle that includes a starting gear 158 and a continuously variable transmission 160 that are commonly called "direct shift CVT", and includes a planetary gear device 162. The planetary gear device 162 is a dual pinion type planetary gear device that is configured similarly to the planetary gear device 114 in the third embodiment.

The continuously variable transmission 160 includes a primary pulley 166, a secondary pulley 168, and a metal belt 170 wound around these pulleys, similarly to the continuously variable transmission 112 in the third embodiment. Similarly to the continuously variable transmission 112, the continuously variable transmission 160 is configured to continuously change a speed ratio by changing winding diameters of the metal belt 170 on the two pulleys.

The planetary gear device 162 includes a sun gear 174 that is integrally provided on an intermediate shaft 172, an inner pinion gear 176 that meshes with the sun gear 174, an outer pinion gear 178 that meshes with the inner pinion gear 176, and a ring gear 180 that meshes with the outer pinion gear 178. A carrier 182 that supports the inner pinion gear 176 and the outer pinion gear 178 is connected to an input shaft 188 by a crank 186, and is connected to the intermediate shaft 172 by a crank 190 via a No. 1 clutch C41.

The input shaft 188 is configured to be connectable to the intermediate shaft 172 at one end, and is connected to an output shaft of the engine 24 at the other end via a torque converter 41, and receives a driving torque from the engine. The input shaft 188 is disconnected from the intermediate shaft 172 when the clutch C41 is in a connected state, and is connected to the intermediate shaft 172 when the clutch C41 is in a disconnected state. The intermediate shaft 172 is adapted to be connected to a shaft 194 of the primary pulley 166 at an end portion on the side opposite to the input shaft 188 side as necessary.

A reverse brake RB is provided outside the ring gear 180 of the planetary gear device 162. The reverse brake RB is configured to apply a braking force to the ring gear 180 when it is in an operating state. Further, the reverse brake RB is maintained in the non-operating state in which the braking force is not applied to the ring gear 180 when the No. 1 clutch C41 is in the connected state, and is set in the operating state when the clutch C41 is in the disconnected state. The states of the clutches C41, C42 and the reverse brake RB are controlled by the shift control unit 16.

It is to be noted that in this embodiment as well, a braking pressure generator (not shown) for operating the reverse brake RB is a device different from a high pressure generator (not shown) of the braking device 20. Therefore, even if an abnormality occurs in the latter high pressure generator, the reverse brake RB can be operated and a necessary braking force can be applied.

The intermediate shaft 172 is provided with a No. 1 drive gear 196, which meshes with No. 1 driven gear 198. The driven gear 198 is adapted to be connected to No. 2 drive gear 202 by a synchro mechanism 200 as necessary. The drive gear 202 meshes with No. 2 driven gear 204, which is configured to be connected to a shaft 206 of the secondary pulley 168 as required. The synchro mechanism 200 is also controlled by the shift control unit 16.

The drive gear 196, the driven gear 198, the synchro mechanism 200, the drive gear 202, and the driven gear 204 constitute a starting gear 158 that transmits a driving torque to the driven gear 204 without passing through the continuously variable transmission 160, as described later. A reduction gear ratio of the starting gear 158 is set higher than a maximum reduction ratio of the continuously variable transmission 160.

Furthermore, the No. 2 driven gear 204 is adapted to rotate integrally with a reduction drive gear 208, and the reduction drive gear 208 meshes with a reduction driven gear 210. The reduction driven gear 210 is integrally connected to a differential drive pinion gear 212 by an output shaft 211, and the differential drive pinion gear 212 meshes with a differential ring gear 214. The differential drive pinion gear 212 and the differential ring gear 214 transmit driving torque to the left and right front wheels 64L and 64R, which are drive wheels, via the drive shafts 62L and 62R as shown in FIG. 1.

<Switching of Driving Force Transmission Mode>

The switching of the driving force transmission mode between a gear mode in which a driving force is transmitted through the starting gear 158 and a belt mode in which a driving force is transmitted through the continuously variable transmission 160 is performed by the synchronizing mechanism 200 and No. 2 clutch C42 being controlled by the shift control unit 16.

The gear mode is set when the drive wheels need to rotate at a low rotation speed and a high torque, such as when the vehicle 14 starts to move. In the gear mode, the synchronizing mechanism 200 is operated and the No. 2 clutch C42 is disconnected. Further, the connection between the intermediate shaft 172 and the shaft 194 of the primary pulley 166 is released.

Therefore, a driving force transmitted from the intermediate shaft 172 to the No. 1 drive gear 196 is transmitted to the No. 2 drive gear 202 through the No. 1 driven gear 198 and the synchronizing mechanism 200. However, since a driving force is not transmitted from the intermediate shaft 172 to the shaft 194 of the primary pulley 166, it is not transmitted from the shaft 206 of the secondary pulley 168 to the No. 2 driven gear 204.

In the belt mode, the operation of the synchronizing mechanism 200 is released, and the No. 2 clutch C42 is connected. Further, the intermediate shaft 172 and the shaft 194 of the primary pulley 166 are connected. As a result, a driving force of the intermediate shaft 172 is transmitted to the shaft 194 of the primary pulley 166, and it is transmitted from the shaft 206 of the secondary pulley 168 to the No. 2 driven gear 204 through the No. 2 clutch C42. Thus, although a driving force is transmitted from the No. 1 drive gear 196 to the No. 1 driven gear 198, it is not transmitted from the driven gear 198 to the No. 2 drive gear 202.

<Switching Between Forward and Backward Movements>

In both the gear mode and the belt mode, switching between forward and backward movements is performed by the No. 1 clutch C41 and the reverse brake RB being controlled by the shift control unit 16. Further, regardless of whether the vehicle 14 is moving forward or backward, the continuous speed ratio control in the belt mode is performed by changing the winding diameters of the metal belt 170 around the primary pulley 166 and the secondary pulley 168 by the shift control unit 16 as described above.

When the vehicle 14 is moving forward, the reverse brake RB is maintained in the inoperative state and the No. 1 clutch C41 is connected. A driving force of the input shaft 188 is transmitted to the intermediate shaft 172 via the crank 186, the carrier 182, the inner pinion gear 176 and the outer pinion gear 178, the clutch C41 and the crank 190.

On the other hand, when the vehicle 14 is moving backward, the No. 1 clutch C41 is disconnected with the reverse brake RB being operated, and the input shaft 188 and the intermediate shaft 172 are connected. A driving force of the input shaft 188 is directly transmitted to the intermediate shaft 172 as a rotational force in the direction opposite to that in the forward movement.

<Alternative Braking Control>

In the alternative braking control in the fourth embodiment, the clutch C41 is connected and the clutch C42 is disconnected. The synchro mechanism 200 is operated and the reverse brake RB is operated. The control mode of the clutch C41, the clutch C42, the synchro mechanism 200, and the reverse brake RB in the alternative braking control is different from the control modes of the clutch C41 and the like when the vehicle 14 is moving forward and backward in either of the gear mode and the belt mode.

By controlling the clutch C41 and the like as described above, the ring gear 180 is braked, and, accordingly, the inner pinion gear 176, the outer pinion gear 178, and the carrier 182 are braked. A braking torque is transmitted to the intermediate shaft 172 by the clutch C41 and the crank 190, and is transmitted to the drive gear 202 via the drive gear 196, the driven gear 198 and the synchronizing mechanism 200.

Further, the braking torque is transmitted from the drive gear 202 to the reduction driven gear 210 via the driven gear 204 and the reduction drive gear 208, whereby the output shaft 211 is braked. The braking torque is further transmitted to the differential drive pinion gear 212 and the differential ring gear 214. As a result, the left and right front wheels 64L and 64R are braked, whereby the vehicle 14 is decelerated, and the vehicle is stopped as necessary.

The carrier 182 supporting the inner pinion gear 176 and the outer pinion gear 178 is connected to the input shaft 188 via the crank 186. Therefore, the input shaft 188 is also braked, but since the input shaft 188 is connected to the output shaft of the engine 24 via the torque converter 41, the engine 24 is prevented from being given a high drag torque by the torque converter 41.

As can be seen from the above description, according to the above-described first to fourth embodiments, the alternative braking control is performed when it is determined that a braking request is generated by the automatic traveling control and braking of the vehicle is required, in a situation where the automatic traveling control is being executed and the braking device 20 and/or the braking control unit 22 is abnormal. Therefore, even in a situation where the braking device 20 and/or the braking control unit 22 is abnormal and braking forces cannot be normally applied to the wheels by the braking device 20, the vehicle 14 can be effectively decelerated and stopped.

Fifth Embodiment

Figure 7:
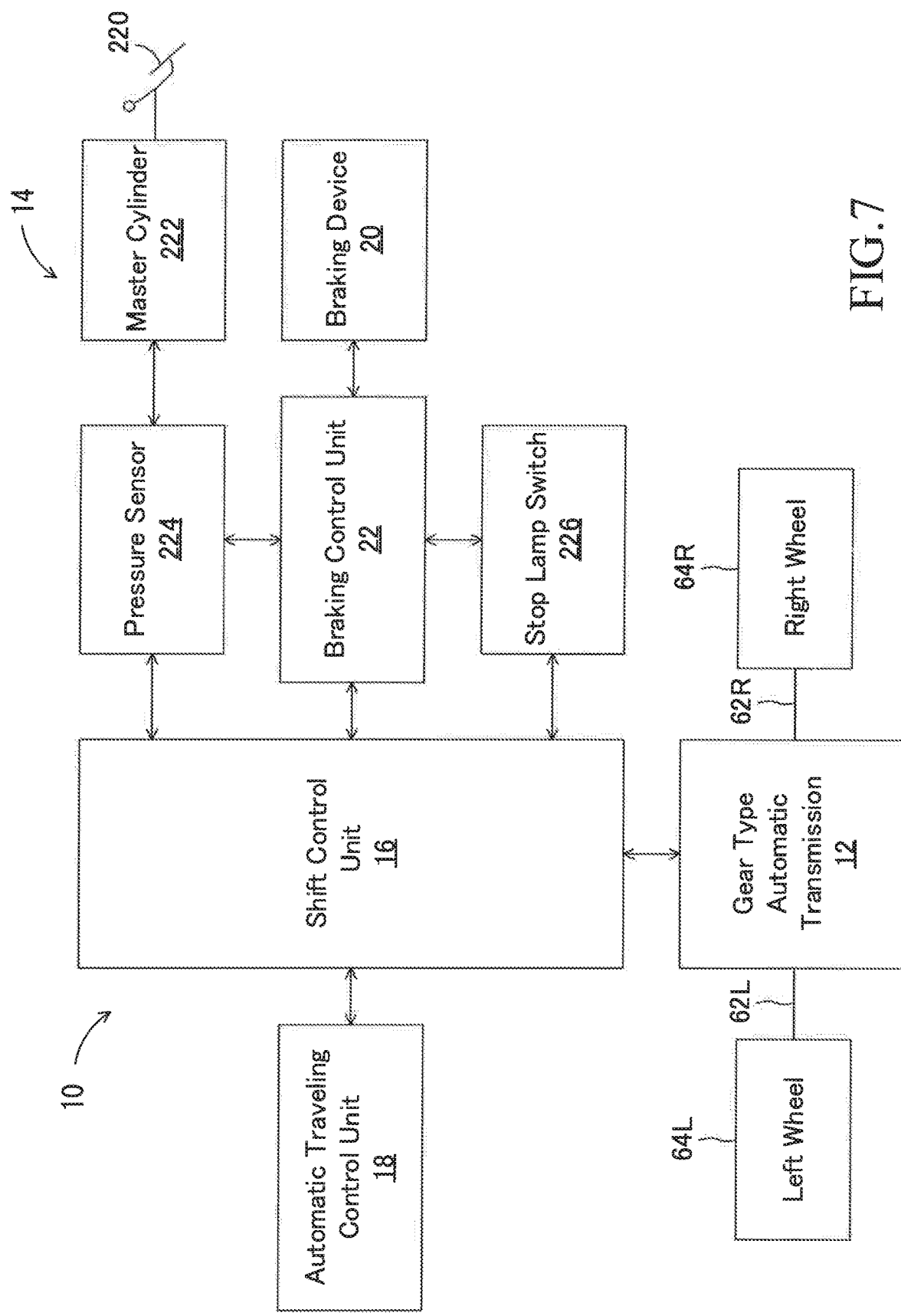
FIG. 7 is a control block diagram including a fifth embodiment of the alternative braking apparatus for a vehicle according to the present disclosure.

FIG. 7 is a control block diagram including a fifth embodiment of the alternative braking device for a vehicle according to the present disclosure. This embodiment is an embodiment in which the alternative braking is executed as necessary while the vehicle is being driven by a driver. In FIG. 7, the same blocks as the blocks shown in FIG. 1 are assigned the same reference numerals as the reference numerals given in FIG. 1.

As shown in FIG. 7, a master cylinder pressure Pm, which is a pressure in a master cylinder 222 driven by a driver operating a brake pedal 220, is detected by a pressure sensor 224. A signal indicating a master cylinder pressure Pm is input to a braking control unit 22, which normally controls a braking device 20 so that a braking force of each wheel becomes a braking force corresponding to the master cylinder pressure Pm.

The brake pedal 220 is provided with a stop lamp switch 226, and the stop lamp switch is turned on when the brake pedal 220 is operated by the driver. It should be noted that the signal indicating the master cylinder pressure Pm and the signal indicating whether or not the stop lamp switch 226 is on are also input to a shift control unit 16 that controls a gear type automatic transmission 12 as necessary. The automatic transmission 12 in this embodiment may be the same as the automatic transmission 12 in any of the first to fourth embodiments described above, and further may be any gear-type automatic transmission as long as it includes at least one clutch and at least one brake and is configured so that an output shaft of the automatic transmission is braked by a braking force of the brake.

<Shift Control by Shift Control Unit>

Figure 8:
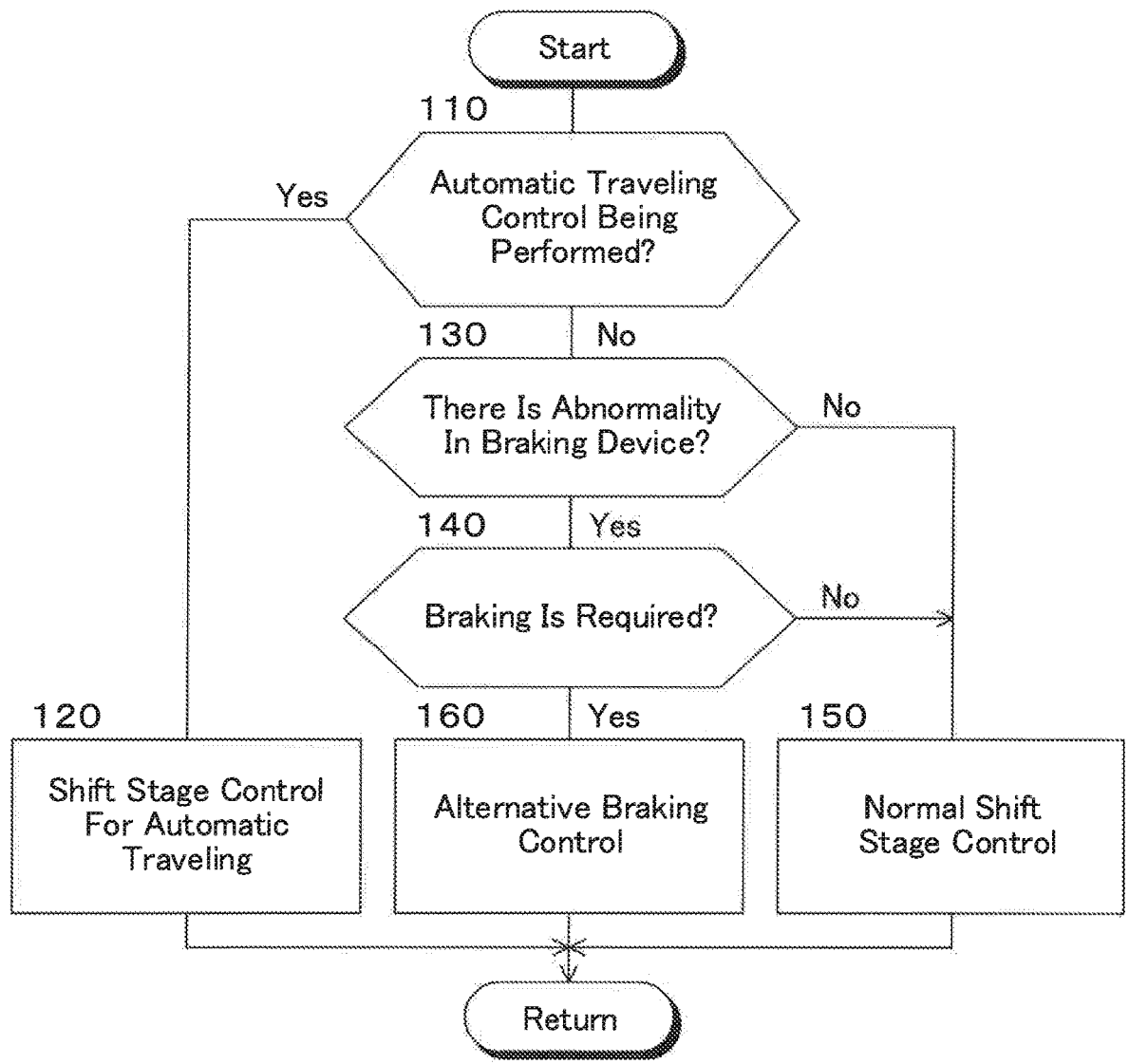
FIG. 8 is a flowchart showing a gear shift control routine including alternative braking control in the fifth embodiment.

Next, a shift control routine including alternative braking control in the fifth embodiment will be described with reference to the flowchart shown in FIG. 8. The shift control according to the flowchart shown in FIG. 8 is repeatedly executed by the shift control unit 16 at predetermined time intervals when an ignition switch (not shown) is turned on.

First, in step 110, similarly to step 10 described above, based on information transmitted from the automatic traveling control unit 18, a determination is made as to whether or not automatic traveling control such as remote parking is being performed. When a negative determination is made, the shift control proceeds to step 130, and when an affirmative determination is made, the shift control proceeds to step 120.

In step 120, similarly to step 50 described above, control of the shift stage necessary for achieving automatic traveling is performed based on information transmitted from the automatic traveling control unit 18.

In step 130, as in step 30 described above, based on information transmitted from the braking control unit 22, a determination is made as to whether or not there is an abnormality in the braking device 20 and/or the braking control unit 22 in which the braking device 20 cannot normally apply braking forces to the wheels. When a negative determination is made, the shift control proceeds to step 150, and when an affirmative determination is made, the shift control proceeds to step 140.

In step 140, based on information transmitted from the stop lamp switch 226, a determination is made as to whether or not the stop lamp switch is on, that is, whether or not braking of the vehicle is required. When an affirmative determination is made, the shift control proceeds to step 160, and when a negative determination is made, the shift control proceeds to step 150. Note that it may be determined that the braking of the vehicle is required when any of the following conditions (4) to (7) is satisfied.

(4) It is determined that the stop lamp switch is on based on the information transmitted from the stop lamp switch 226.

(5) Based on the information transmitted from the braking control unit 22, it is determined that the master cylinder pressure Pm is equal to or higher than a reference value.

(6) It is estimated that braking forces cannot be normally applied to the wheels due to an abnormality in the braking device 20 and/or the braking control unit 22.

(7) Communication cannot be performed with the braking control unit 22, and it cannot be confirmed that braking forces can be normally applied to the wheels.

In step 150, similarly to step 20 described above, the normal shift control is performed in a manner known in the art according to a driving operation of the driver and a traveling condition of the vehicle.

In step 160, the alternative braking is performed to control the clutch and the brake so that the output shaft of the automatic transmission is braked by a braking force of the brake of the automatic transmission 12. When a signal indicating a master cylinder pressure Pm is input from the pressure sensor 224 to the shift control unit 16, the braking force of the brake of the automatic transmission 12 may be controlled according to the master cylinder pressure Pm. On the other hand, when a signal indicating the master cylinder pressure Pm is not input from the pressure sensor 224 to the shift control unit 16, the braking force of the brake of the automatic transmission 12 may be gradually increased and the vehicle 14 may be stopped.

According to the fifth embodiment, the alternative braking control is performed even when a driver's braking request occurs and braking of the vehicle is required in a situation where the driver is driving the vehicle and the braking device 20 and/or the braking control unit 22 is abnormal. Therefore, even when the braking device 20 and/or the braking control unit 22 is abnormal and braking forces cannot be normally applied to the wheels by the braking device 20, the vehicle 14 can effectively be decelerated to stop so that the braking request of the driver is satisfied.

Although the present disclosure has been described in detail with reference to specific embodiments, it will be apparent to those skilled in the art that the present disclosure is not limited to the above-described embodiments, and various other embodiments are possible within the scope of the present disclosure.

For example, although the alternative braking control is executed by the shift control unit 16, it may be executed by the automatic traveling control unit 18 or another control unit in the first to fourth embodiments, and it may be executed by a control unit other than the shift control unit 16 in the fifth embodiment.

In the first embodiment, the gear type automatic transmission 12 is an 8-speed automatic transmission for a front-wheel drive vehicle, and in the second embodiment, the gear type automatic transmission 12 is a 10-speed automatic transmission for a rear-wheel drive vehicle. Further, in the third and fourth embodiments, the gear type automatic transmission 12 is a gear type automatic transmission for a front-wheel drive vehicle including a continuously variable transmission. However, a gear type automatic transmission of a vehicle to which the present disclosure is applied may be any gear type automatic transmission as long as it includes at least one clutch and at least one brake and an output shaft of the automatic transmission is braked by a braking force of the brake.

In the first embodiment, the alternative braking is performed by controlling the clutch and the brake in a state where the input shaft 32 can freely rotate. Further, in the second to fourth embodiments, a drag torque applied to the engine 24 is reduced by the action of the torque converter 41 during the alternative braking. However, in a vehicle provided with a clutch that controls transmission and non-transmission of driving force instead of the torque converter, the clutch may be disconnected during alternative braking.

In the first to fourth embodiments, the alternative braking is performed as needed during control of automatic traveling, and in the fifth embodiment, the alternative braking is performed during traveling by a driver's driving operation. However, the first to fourth embodiments and the fifth embodiment may be combined. That is, when an affirmative determination is made in step 110 of the flowchart shown in FIG. 8, steps 30 to 60 of the flowchart shown in FIG. 3 may be executed instead of step 120.

Further, although the fifth embodiment is applied to a vehicle capable of controlling automatic traveling, the fifth embodiment may be applied to a vehicle in which the automatic traveling control unit 18 is not provided and therefore the automatic traveling control is not performed. In that case, the automatic traveling control unit 18 of the block diagram shown in FIG. 7 is omitted, and steps 110 and 120 of the flowchart shown in FIG. 8 are omitted.

What is claimed is:

1. An alternative braking apparatus for a vehicle including a gear type automatic transmission having at least one clutch and at least one transmission brake for changing the meshing state of gears, and a control unit configured to switch shift stages of the automatic transmission by controlling the clutch and the transmission brake, wherein
    the control unit is configured to perform alternative braking that controls the clutch and the transmission brake to change the meshing state of gears so that a braking force of the transmission brake is transmitted to an output shaft of the automatic transmission through the gears to brake the output shaft but an input shaft of the automatic transmission is not braked by the braking force of the brake when the control unit determines that a braking device of the vehicle cannot normally apply braking forces to wheels despite that the vehicle needs to be braked.

2. The alternative braking apparatus for a vehicle according to claim 1, wherein a control mode of the clutch and the brake when the alternative braking is performed is different from control modes of the clutch and the brake when the vehicle travels without the alternative braking being performed.

3. The alternative braking apparatus for a vehicle according to claim 1, wherein the vehicle is configured to be controlled by automatic traveling, and the control unit is configured to perform the alternative braking when the control unit determines that the braking device of the vehicle cannot normally apply braking forces to the wheels despite that the vehicle needs to be braked during the control of the automatic traveling.

4. The alternative braking apparatus for a vehicle according to claim 1, wherein the automatic traveling is any one of automatic traveling for unmanned remote parking, automatic traveling for unmanned automatic valley parking, automatic traveling for manned driving assistance, and automatic traveling for manned automatic driving.

5. The alternative braking apparatus for a vehicle according to claim 1, wherein the control unit is configured to perform the alternative braking when the control unit determines that the braking device of the vehicle cannot normally apply braking forces to the wheels despite that the vehicle needs to be braked while the vehicle is driven by a driver.

* * * * *